United States Patent
Tu et al.

(10) Patent No.: US 7,733,537 B2
(45) Date of Patent: Jun. 8, 2010

(54) SCANNING DEVICE AND CALIBRATION MECHANISM THEREOF

(75) Inventors: Ching-Jung Tu, Hsinchu (TW); Chi-Yao Chen, Hsinchu (TW)

(73) Assignee: Avision Inc. (TW)

( * ) Notice: Subject to any disclaimer, the term of this patent is extended or adjusted under 35 U.S.C. 154(b) by 734 days.

(21) Appl. No.: 11/505,864

(22) Filed: Aug. 18, 2006

(65) Prior Publication Data

US 2007/0047029 A1 Mar. 1, 2007

(30) Foreign Application Priority Data

Aug. 31, 2005 (TW) .............................. 94129913 A

(51) Int. Cl.
  *H04N 1/04* (2006.01)
  *H04N 1/40* (2006.01)
(52) U.S. Cl. ................. 358/461; 358/474; 358/496; 358/497; 358/498; 358/482; 358/483; 358/408; 358/406
(58) Field of Classification Search ................. 358/461, 358/496, 498, 486, 497, 408, 401, 474, 505, 358/501, 406, 504, 482, 483; 399/367, 374, 399/364; 355/23, 24; 382/274
See application file for complete search history.

(56) References Cited

U.S. PATENT DOCUMENTS

| 6,323,933 | B1 * | 11/2001 | Anzai ........................... 355/23 |
| 6,967,749 | B2 * | 11/2005 | Chen ........................... 358/406 |
| 7,110,148 | B2 * | 9/2006 | Hasegawa et al. ........... 358/474 |
| 7,428,078 | B2 * | 9/2008 | Yang ........................... 358/461 |
| 7,457,006 | B2 * | 11/2008 | Wilsher et al. .............. 358/461 |
| 7,463,392 | B2 * | 12/2008 | Yamamoto et al. .......... 358/496 |

* cited by examiner

*Primary Examiner*—Cheukfan Lee

(57) ABSTRACT

A scanning device includes a first chassis, a second chassis and a calibration mechanism. The first chassis is for scanning one side of a document. The second chassis is for scanning the other side of the document. The second chassis is movably disposed opposite the first chassis. The calibration mechanism is for calibrating the color depth of the scan image. The calibration mechanism includes a calibration sheet and an elastic member. One end of the elastic member is fixed in the scanning device. The second chassis exerts a force on the calibration sheet to generate a relative movement between the calibration sheet and the first chassis. When the second chassis ceases exerting the force, the elastic member releases a resilient force for moving the calibration sheet to a starting position. The first chassis performs dynamic calibration by the relative movement between the first chassis and the calibration sheet.

21 Claims, 4 Drawing Sheets

SCANNING DEVICE AND CALIBRATION MECHANISM THEREOF

This application claims the benefit of Taiwan application Ser. No. 94129913, filed Aug. 31, 2005, the subject matter of which is incorporated herein by reference.

BACKGROUND OF THE INVENTION

1. Field of the Invention

The invention relates in general to a calibration mechanism, and more particularly to a calibration mechanism of a scanning device thereof.

2. Description of the Related Art

The scanner is mainly used for scanning a document or a photo, and then transforming the image into an electronic file for the convenience of storage, transmission and editing. The automatic document feeder (ADF) scanner, a scanner used for scanning a double-sided document or image, is both time-saving and convenient to the user.

Referring to FIG. 1A, an ADF scanner is shown. The ADF scanner 100 includes a body 101 and an ADF 103. The body 101 includes a bottom chassis 107 and a calibration sheet 108. The ADF 103 includes a top chassis 105. The top chassis 105 and the bottom chassis 107 are used for scanning different sides of a document to obtain the image data from different sides of the document.

When the scanner 100 is started up or in the warm-up process, the scanner 100 first of all scans a calibration sheet, and then uses the image data of the calibration sheet as a reference for the shading correction and compensation of the system and improving the color cast problem of the image. Referring to both FIG. 1A and FIG. 1B, a relative position between a top chassis and a calibration sheet is shown. According to a conventional scanning method, the calibration sheet 108 is fixed in the body 101. Since the calibration sheet 108 is fixed, the top chassis 105 is fixed as well. During the calibrating process, the top chassis 105 keeps scanning the same scan line on the calibration sheet 108. This is called "static calibration". As shown in FIG. 1B, the top chassis 105 can only scan the scan line positioned at $A_x$. As for other scan lines, the scan lines corresponding to the positions of $A_0$, $A_1$ to $A_n$ on the calibration sheet 108 will never be scanned. However, such method has a disadvantage. When the position of Ax on calibration sheet 108 is smudged by dirt or dust, the calibration sheet 108 will be incapable of providing precise reference. As a result, the scanning quality of the scanner 100 is greatly affected.

SUMMARY OF THE INVENTION

It is therefore an object of the invention to provide a dynamic calibration mechanism, such that accurate reference data and an average value for the shading correction could be obtained even if dust or dirt smudges a part of the calibration sheet.

The invention achieves the above-identified object by providing a scanning device. The scanning device includes a first chassis, a second chassis and a calibration mechanism. The first chassis is used for scanning one side of a document. The second chassis is used for scanning the other side of the document. The second chassis is movably disposed opposite the first chassis. The calibration mechanism includes a calibration sheet and an elastic member. One end of the elastic member is fixed in the scanning device. The second chassis exerts a force on the calibration sheet to generate a relative movement between the calibration sheet and the first chassis. When the second chassis ceases exerting the force, the elastic member releases a resilient force for moving the calibration sheet back to a starting position.

The invention further achieves the above-identified object by providing a calibration mechanism disposed in a scanning device. The scanning device further includes a first chassis and a second chassis. The second chassis is disposed opposite the first chassis. The calibration mechanism includes a calibration sheet and an elastic member. One end of the elastic member is fixed in the scanning device. The second chassis exerts a force on the calibration sheet to generate a relative movement between the calibration sheet and the first chassis. When the second chassis ceases exerting the force, the elastic member releases a resilient force for moving the calibration sheet to a starting position.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1A:
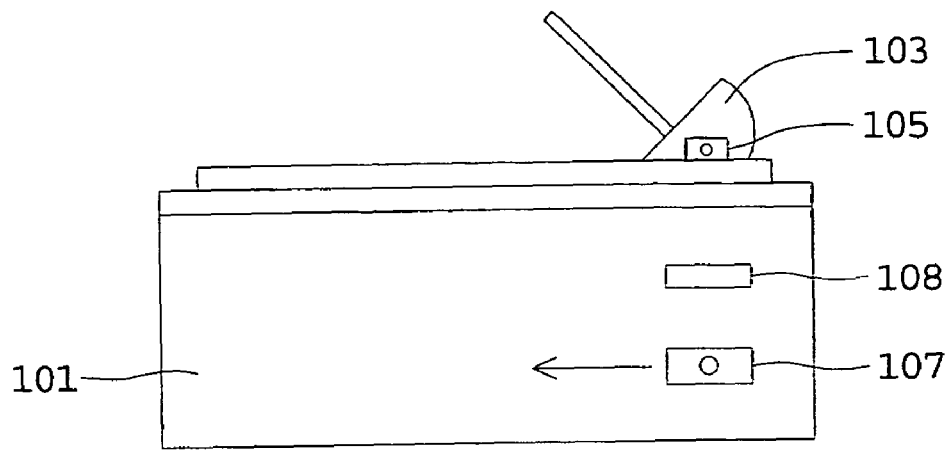
FIG. 1A (Prior Art) illustrates an ADF scanner.
Figure 1B:
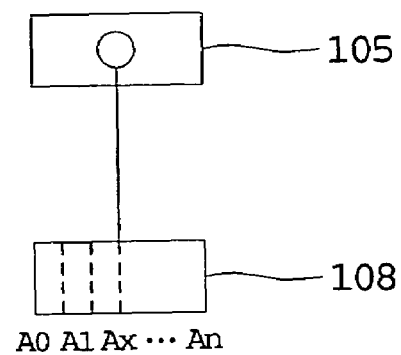
FIG. 1B (Prior Art) illustrates a relative position between a top chassis and a calibration sheet.
Figure 2A:
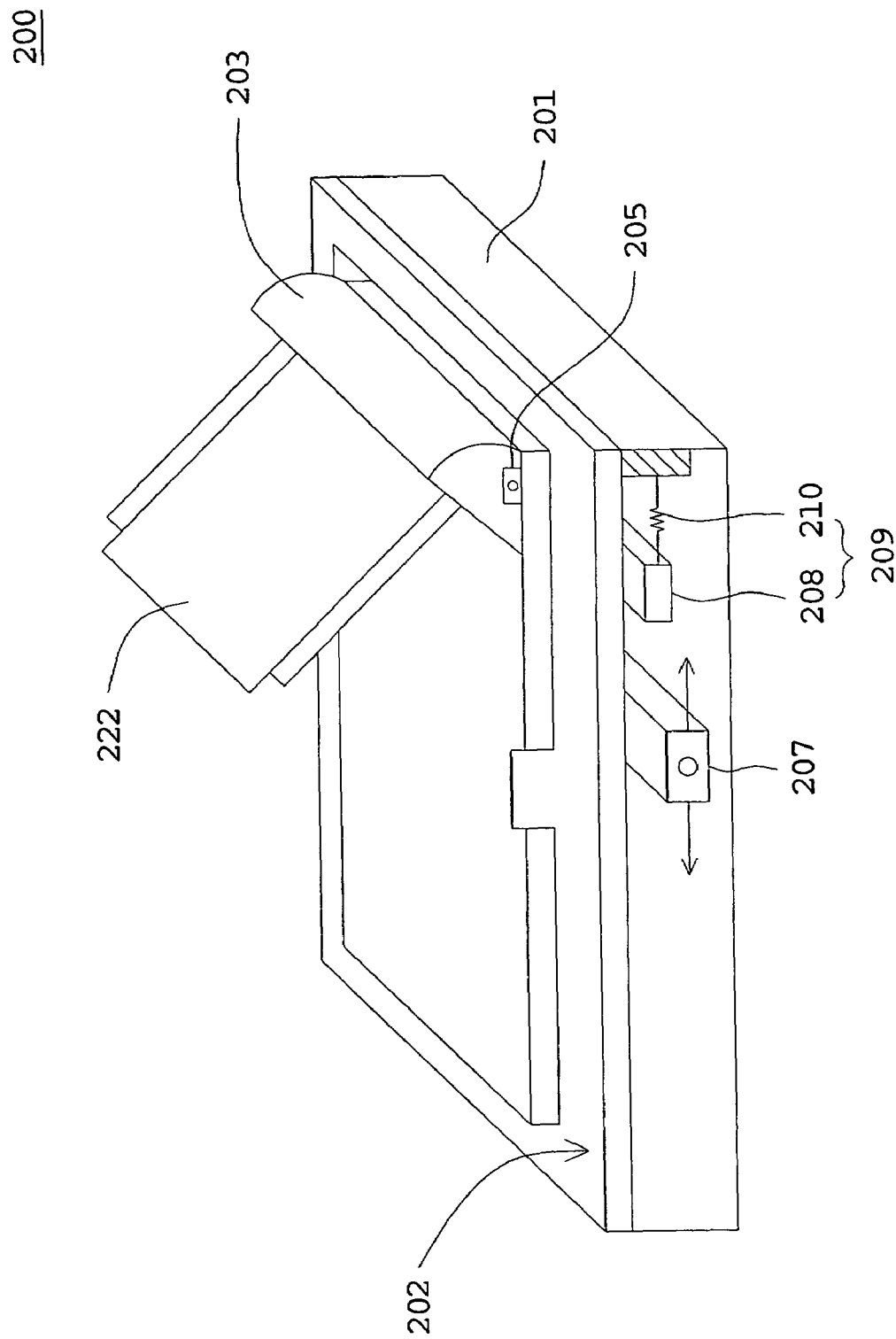
FIG. 2A illustrates a scanning device according to a first embodiment of the invention.

Referring to FIG. 2A, a scanning device according to a first embodiment of the invention is shown. The scanning device 200 includes a platform 202, an automatic document feeder (ADF) 203 and a body 201. Examples of the scanning device 200 include an ADF scanner. The ADF 203 has a first chassis 205 disposed thereon. The body 201 disposed opposite the ADF 203 includes a second chassis 207 and a calibration mechanism 209. The second chassis 207 is movably disposed in body 201. The calibration mechanism 209 includes a calibration sheet 208 and an elastic member 210. The calibration sheet 208 and the elastic member 210 are positioned underneath the platform 202. The ADF 203 is used for carrying the document 222. The first chassis 205 disposed in ADF 203 is used for scanning one side of the document 222. The second chassis 207 disposed in the body 201 is used for scanning the other side of the document 222. One end of the elastic member 210 disposed in the calibration mechanism 209 is fixed in the body 201.

Figure 2B:
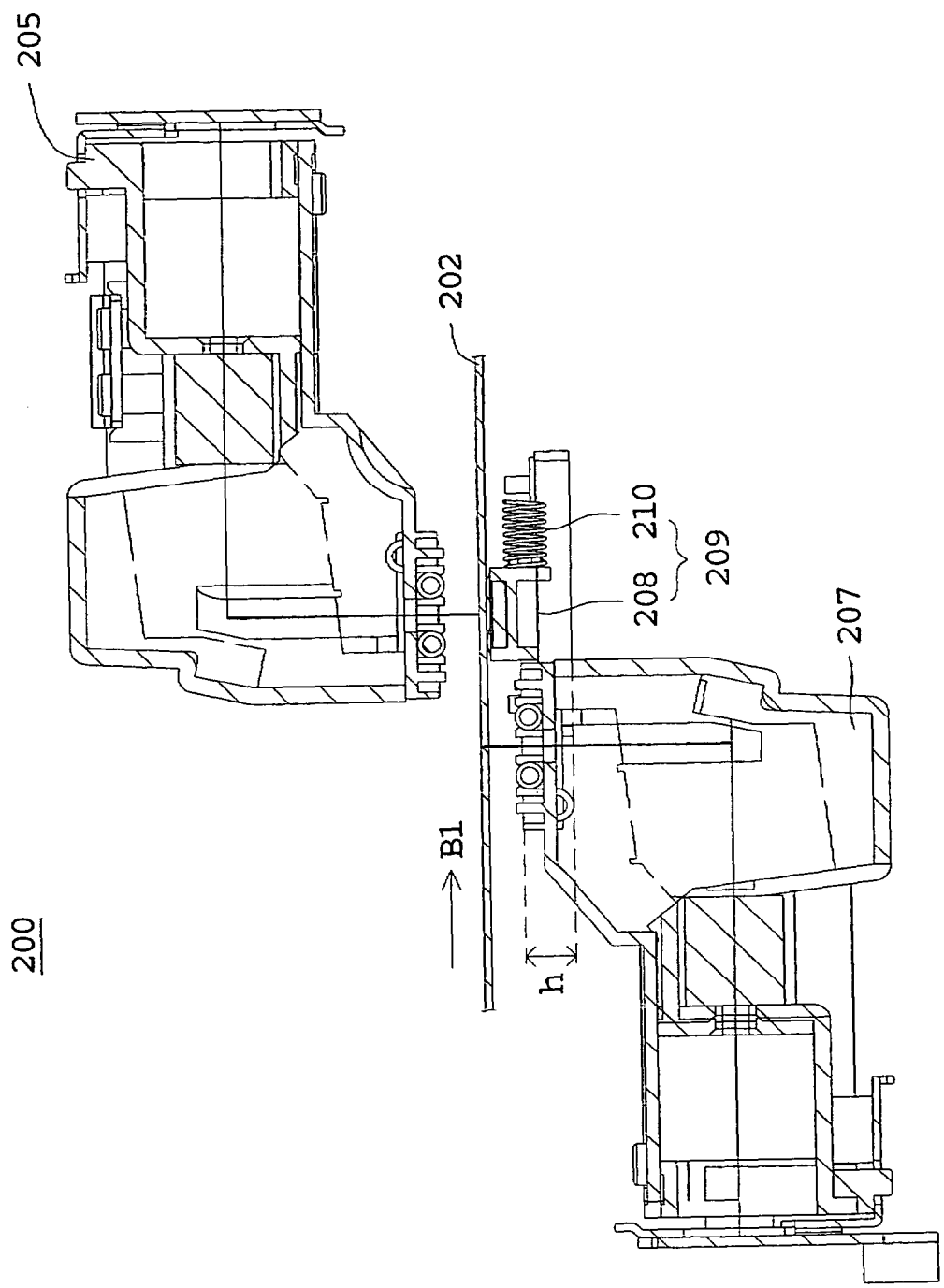
FIG. 2B illustrates a relative relationship among a calibration mechanism, a first chassis, and a second chassis of the scanning device in FIG. 2A.

Referring to FIG. 2B, a relative relationship among a calibration mechanism, a first chassis and a second chassis of the scanning device in FIG. 2A is shown. When the scanning device 200 is started up or in the warming-up process and before the document 222 is scanned, the scanning device 200 first of all calibrates the color depth. The second chassis 207 moves underneath the platform 202 and in a direction parallel to the surface of the platform 200. Since the second chassis 207 and the calibration sheet 208 have an interference height h, when the second chassis 207 moves in a B1 direction parallel to the surface of the platform 202 to interfere with the calibration sheet 208, the second chassis 207 exerts a force on the calibration sheet 208 for enabling the calibration sheet 208 to move in the B1 direction as well. Meanwhile, the elastic member 210 adjacent to the calibration sheet 208 is compressed. When the elastic member 210 is compressed, a resilient force is stored in the elastic member 210. The elastic member 210 is used for providing a resilient force. When the second chassis 207 ceases exerting the force on the calibration sheet 208, the second chassis 207, which no longer interferes with the calibration sheet 208, enables the calibration sheet 208 to yield to the resilient force stored in the elastic member 210, such that the calibration sheet 208 returns to a starting position where the calibration sheet 208 is positioned before the second chassis 207 exerts any force on the calibration sheet 208. Examples of the elastic member 210 include a spring or an elastomer, which enables the calibration sheet 208 to return to the starting position. The second chassis 207 may apply a force on the calibration sheet 208 by pulling or pushing. The other end of the elastic member 210 can be connected to the calibration sheet 208. Consequently, the elastic member 210 can be compressed or extended. Therefore, when the second chassis 207 pulls the calibration sheet 208, the elastic member 210 is extended. When the second chassis ceases exerting the force, the elastic member 210 pulls the calibration sheet 208 to return to the starting position. The process of dynamic calibration is disclosed below.

Figure 2C:
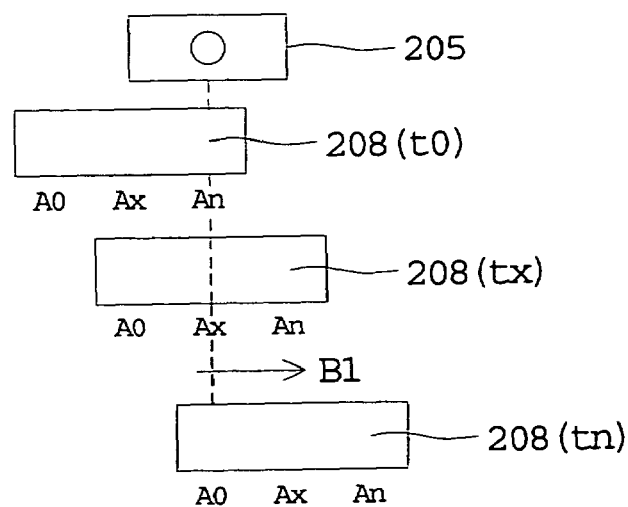
FIG. 2C illustrates a relative relationship between the first chassis and the calibration sheet of the scanning device in FIG. 2A.

Referring to FIG. 2C, a relative relationship between the first chassis and the calibration sheet of the scanning device in FIG. 2A is shown. The calibration sheet is a standard sheet having a single grey level. Assuming at time $t_0$, the first chassis 205 scans the part of the calibration sheet 208 at point $A_n$, the first chassis 205 can obtain the image data of the scan line positioned at point $A_n$. Since the calibration sheet 208 is pushed by the second chassis 207, the first chassis 205 can acquire the image data of the scan lines positioned on different parts of the calibration sheet 208. For example, at time $t_x$, the first chassis 205 acquires the image data of the scan lines at point $A_x$; and at time $t_n$, the first chassis 205 acquires the image data of the scan lines at point $A_0$. Theoretically, each scan line on the calibration sheet 208 has the same image data. However, in practice, after numerous uses of the scanning device, a certain scan line on the calibration sheet 208 may be smudged by dirt or dust. If the first chassis 205 only acquires the image data of one scan line and used the image data alone as the calibration reference, the calibration results may be inaccurate. If the image data of a number of scan lines are obtained, the scanning device is able to compare the image data of a number of scan lines and exclude the abnormal image data. As a result, whether the calibration sheet 208 is stained or not will not cause any problem in calibration.

Second Embodiment

Figure 3:
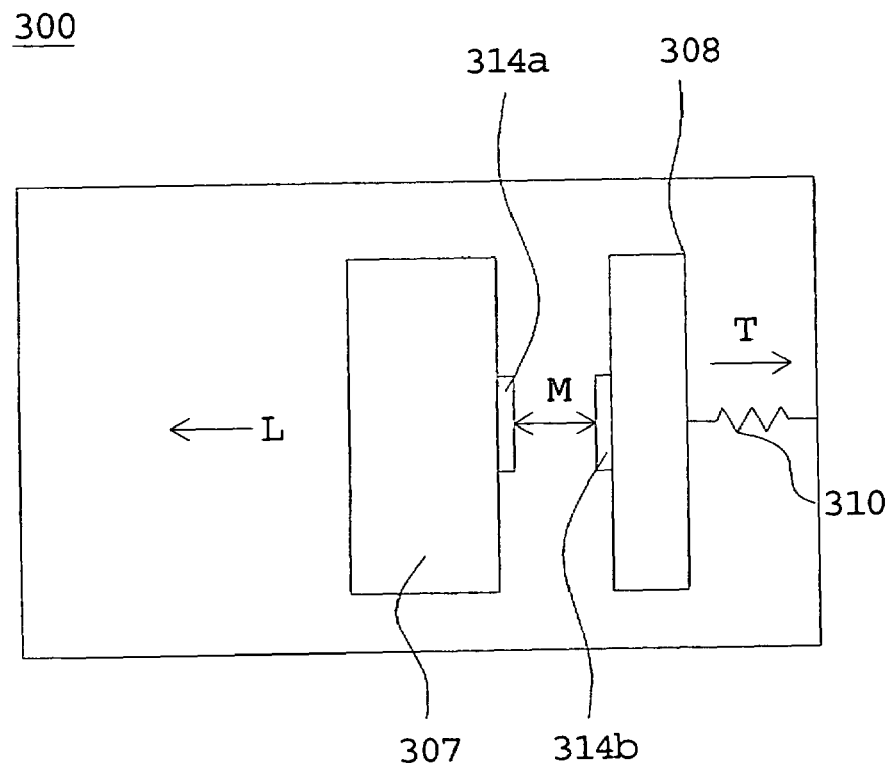
FIG. 3 illustrates a relative relationship between the second chassis and the calibration sheet according to a second embodiment of the invention.

Unlike the first embodiment which uses the second chassis to directly contact and drive the calibration sheet to move, in the second embodiment, the second chassis can drive the calibration sheet to move by a non-contact force such a magnetic force for instance. Referring to FIG. 3, a relative relationship between the second chassis and the calibration sheet according to a second embodiment of the invention is shown. In the scanning device 300, two magnetic members 314a and 314b are respectively disposed on the second chassis 307 and the calibration sheet 308, so that the second chassis 307 is able to drive the calibration sheet 308 in a certain direction such as an L direction without directly contact with the calibration sheet 308. When the calibration sheet 308 moves beyond a certain distance, the tensile force T of the elastic member 310 is larger than the magnetic force M between the calibration sheet 308 and the second chassis 307. As a result, the elastic member 310 will pull the calibration sheet 308 back to the starting position. Furthermore, the present embodiment can adopt an electromagnetic controlling device to cut off the electricity when the calibration sheet 308 moves beyond a certain distance so that the elastic member 310 can pull the calibration sheet 308 back.

According to the scanning device and the calibration mechanism thereof disclosed in the first embodiment and the second embodiment of the invention, the second chassis can drive the calibration sheet by different types of forces to generate a relative movement between the calibration sheet and the first chassis, so that the first chassis is able to obtain the image data of the scan lines corresponding to various points on the calibration sheet and then screen out abnormal image data. For example, the image data of the scan lines corresponding to the tainted points on the calibration sheet will be screened out, thus avoiding incorrect judgment caused by the dirt or dust alighted on the calibration sheet which occurs in the static calibration.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanning device, comprising:
a first chassis for scanning one side of a document;
a second chassis for scanning the other side of the document, wherein the second chassis is movably disposed opposite the first chassis; and
a calibration mechanism, disposed opposite the first chassis and separately disposed from and at a lateral side of the second chassis, for the calibration of the first chassis, the calibration mechanism comprising:
a calibration sheet;
wherein the second chassis disposed at the lateral side of the calibration sheet exerts a force on the calibration sheet to generate a lateral movement of the calibration sheet, such that the first chassis obtains image data of scan lines positioned on different parts of the calibration sheet.

2. The scanning device according to claim 1, wherein the calibration mechanism further comprises an elastic member, one end of the elastic member is fixed in a body of the scanning device; wherein when the second chassis ceases exerting the force, the elastic member releases a resilient force for moving the calibration sheet back to a starting position.

3. The scanning device according to claim 2 further comprising a platform, disposed between the first chassis and the second chassis, for placing the document, the calibration sheet and the elastic member being positioned on the same side of the platform as the second chassis.

4. The scanning device according to claim 2, wherein the elastic member is a spring or an elastomer.

5. The scanning device according to claim 2, wherein the second chassis pushes the calibration sheet to generate a relative movement between the calibration sheet and the first chassis.

6. The scanning device according to claim 5, wherein the second chassis pushes the calibration sheet and compresses the elastic member.

7. The scanning device according to claim 2, wherein the other end of the elastic member is connected to the calibration sheet.

8. The scanning device according to claim 7, wherein the second chassis pulls the calibration sheet to generate a relative movement between the calibration sheet and the first chassis.

9. The scanning device according to claim 8, wherein the second chassis pulls the calibration sheet and extends the elastic member.

10. The scanning device according to claim 8, wherein an attraction force exists between the second chassis and the calibration sheet for attracting the calibration sheet to move in the same direction as the second chassis.

11. The scanning device according to claim 1 further comprising an automatic document feeder (ADF), and the first chassis being disposed in the ADF.

12. The scanning device according to claim 11 being an ADF scanner.

13. A calibration mechanism disposed in a scanning device, wherein the scanning device comprises a first chassis, a second chassis and the calibration mechanism, the second chassis and the calibration mechanism are disposed opposite the first chassis, and the calibration mechanism comprises:
   a calibration sheet;
   wherein, the calibration mechanism is separately disposed from and at a lateral side of the second chassis for the calibration of the first chassis, and the second chassis disposed at the lateral side of the calibration sheet exerts a force on the calibration sheet to generate a lateral movement of the calibration sheet, such that the first chassis obtains image data of scan lines positioned on different parts of the calibration sheet.

14. The calibration mechanism according to claim 13 further comprising an elastic member, wherein one end of the elastic member is fixed in the scanning device, and wherein when the second chassis ceases exerting the force, the elastic member releases a resilient force for moving the calibration sheet back to a starting position.

15. The calibration mechanism according to claim 14, wherein the elastic member is a spring or an elastomer.

16. The calibration mechanism according to claim 14, wherein the second chassis pushes the calibration sheet to generate a relative movement between the calibration sheet and the first chassis.

17. The calibration mechanism according to claim 16, wherein the second chassis pushes the calibration sheet and compresses the elastic member.

18. The calibration mechanism according to claim 14, wherein the other end of the elastic member is connected to the calibration sheet.

19. The calibration mechanism according to claim 18, wherein the second chassis pulls the calibration sheet to generate a relative movement between the calibration sheet and the first chassis.

20. The calibration mechanism according to claim 19, wherein the second chassis pulls the calibration sheet and extends the elastic member.

21. The calibration mechanism according to claim 19, wherein a magnetic force exists between the second chassis and the calibration sheet for attracting the calibration sheet to move in the same direction as the second chassis.

* * * * *